April 20, 1937. W. FAIRCHILD 2,077,878
TOWEL CUTTING AND FOLDING MACHINE
Filed March 9, 1936 9 Sheets-Sheet 7

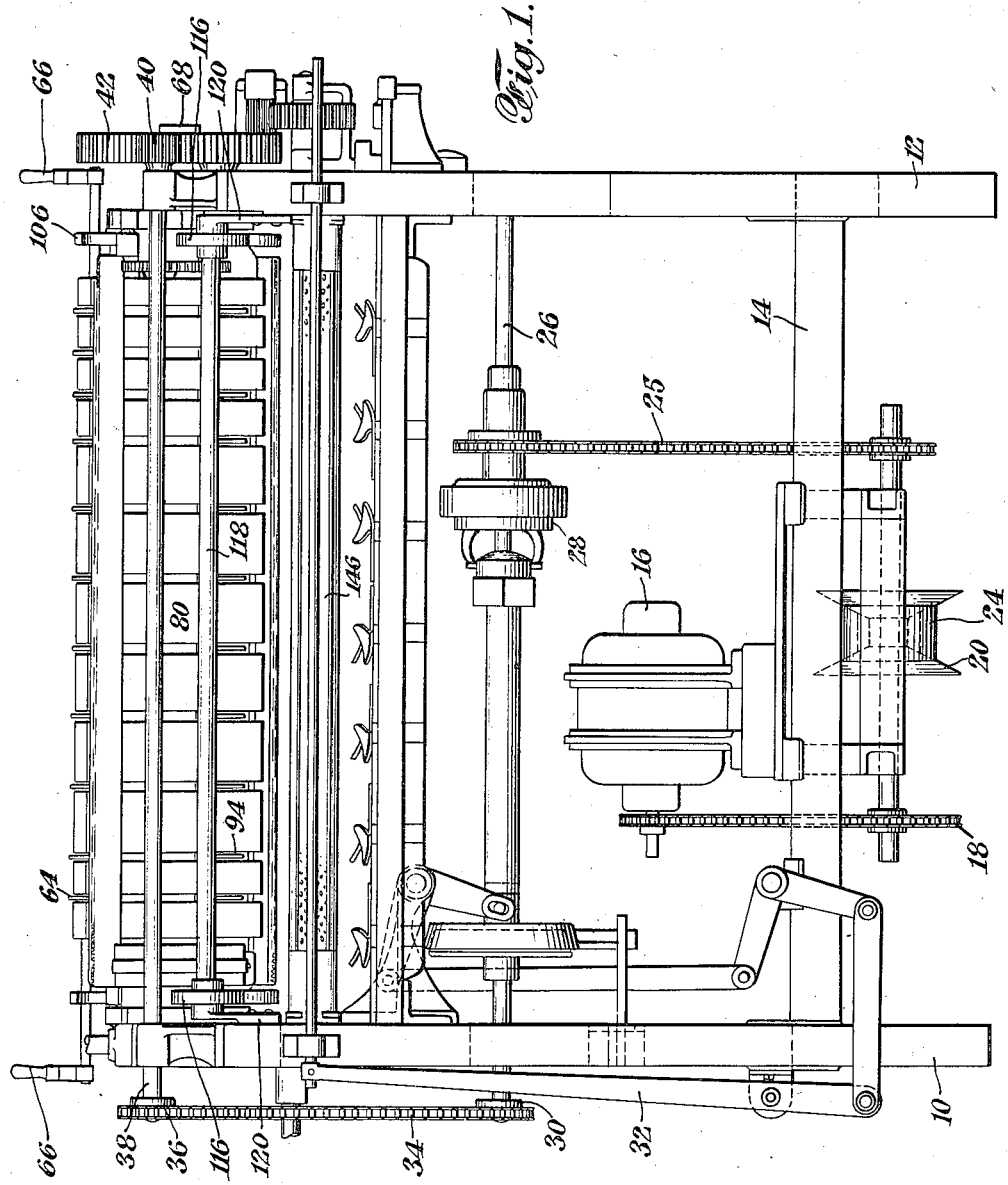

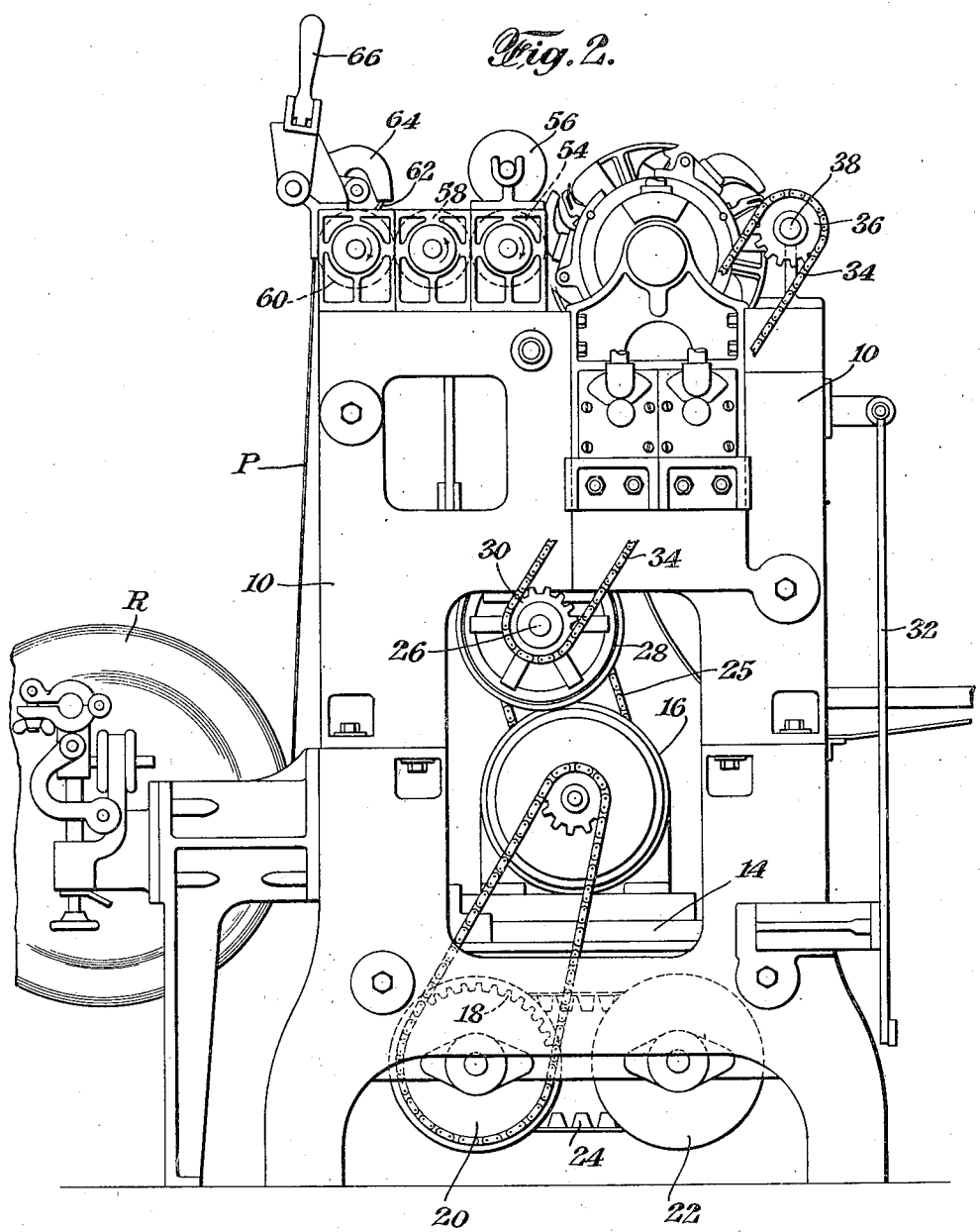

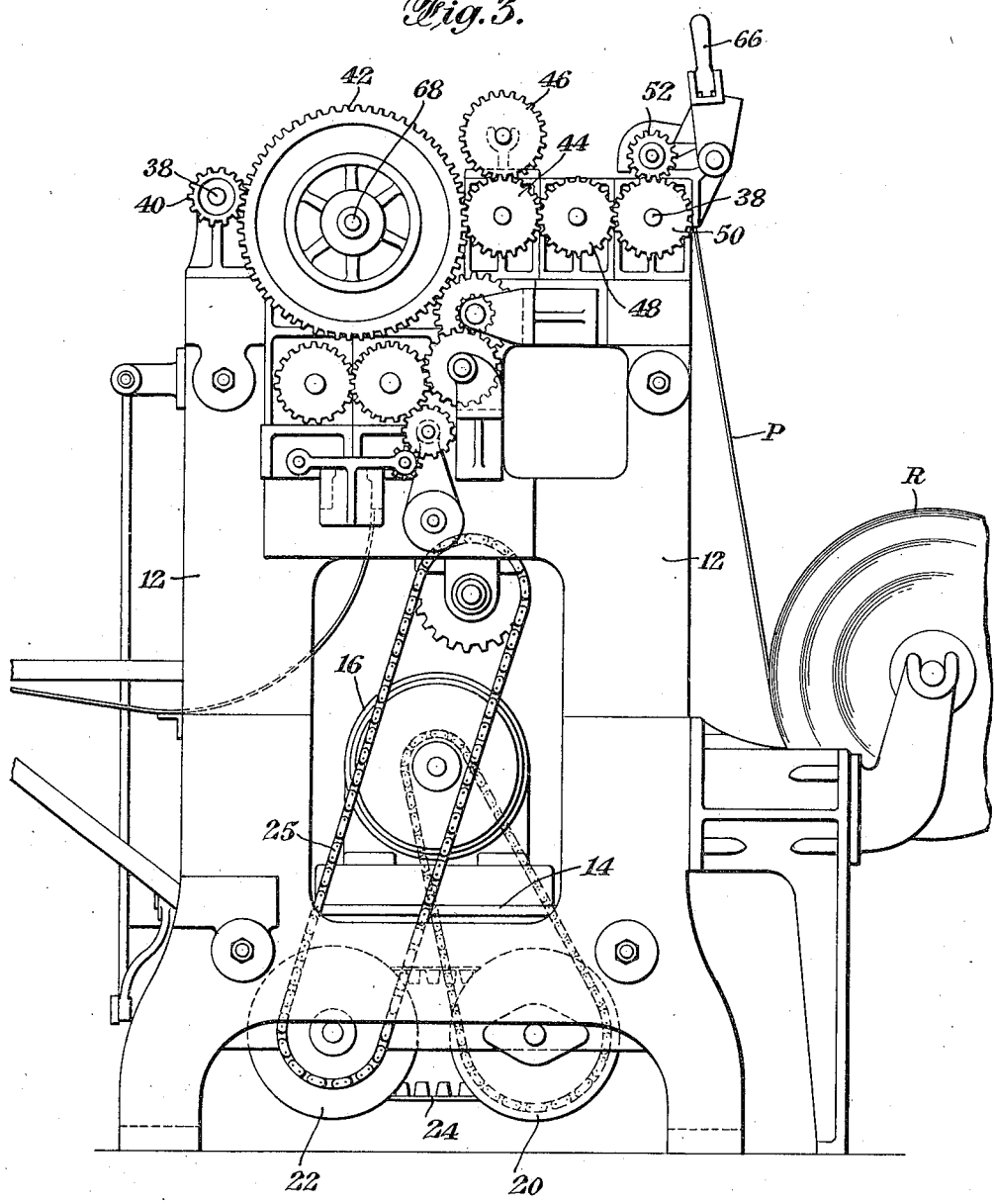

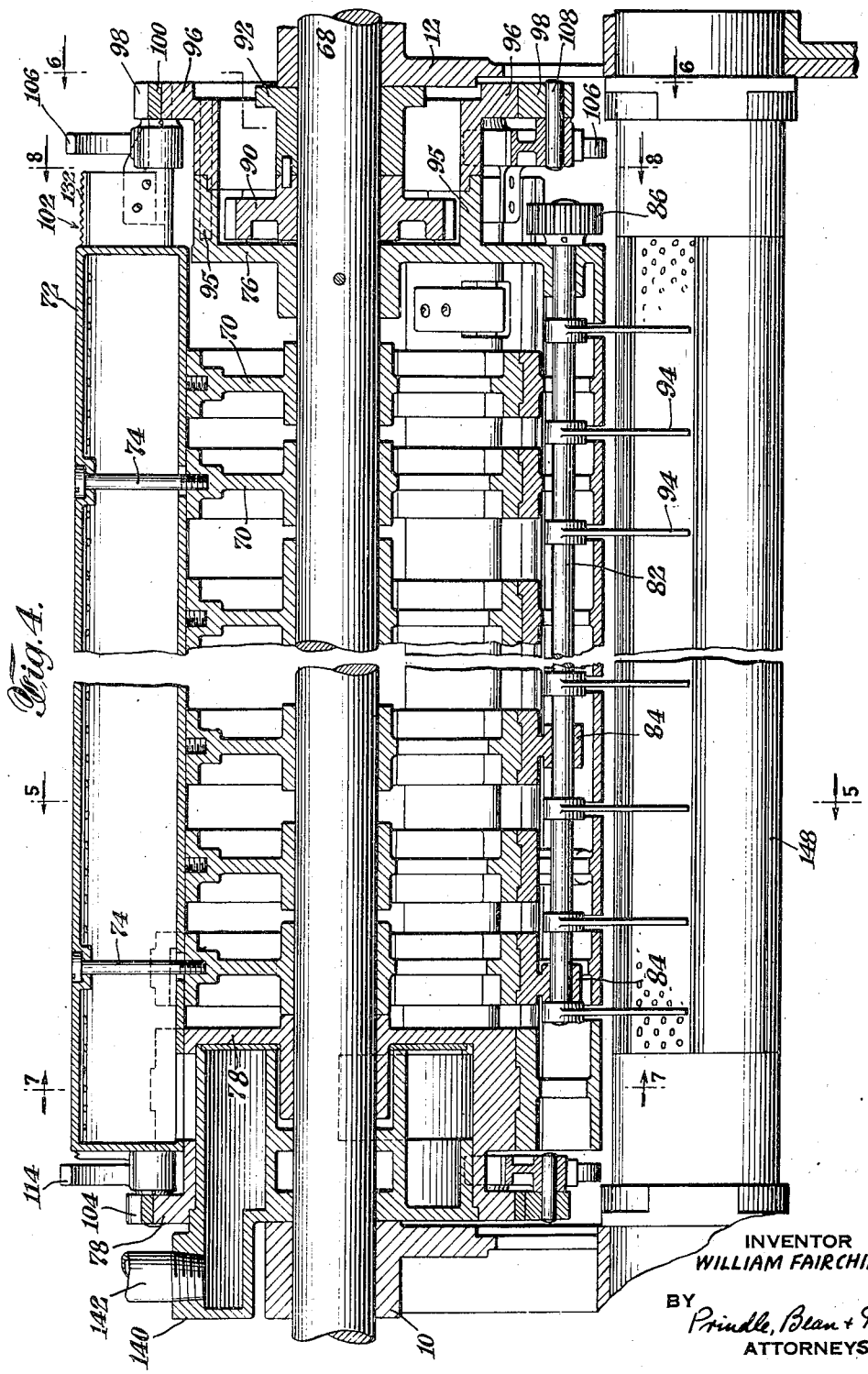

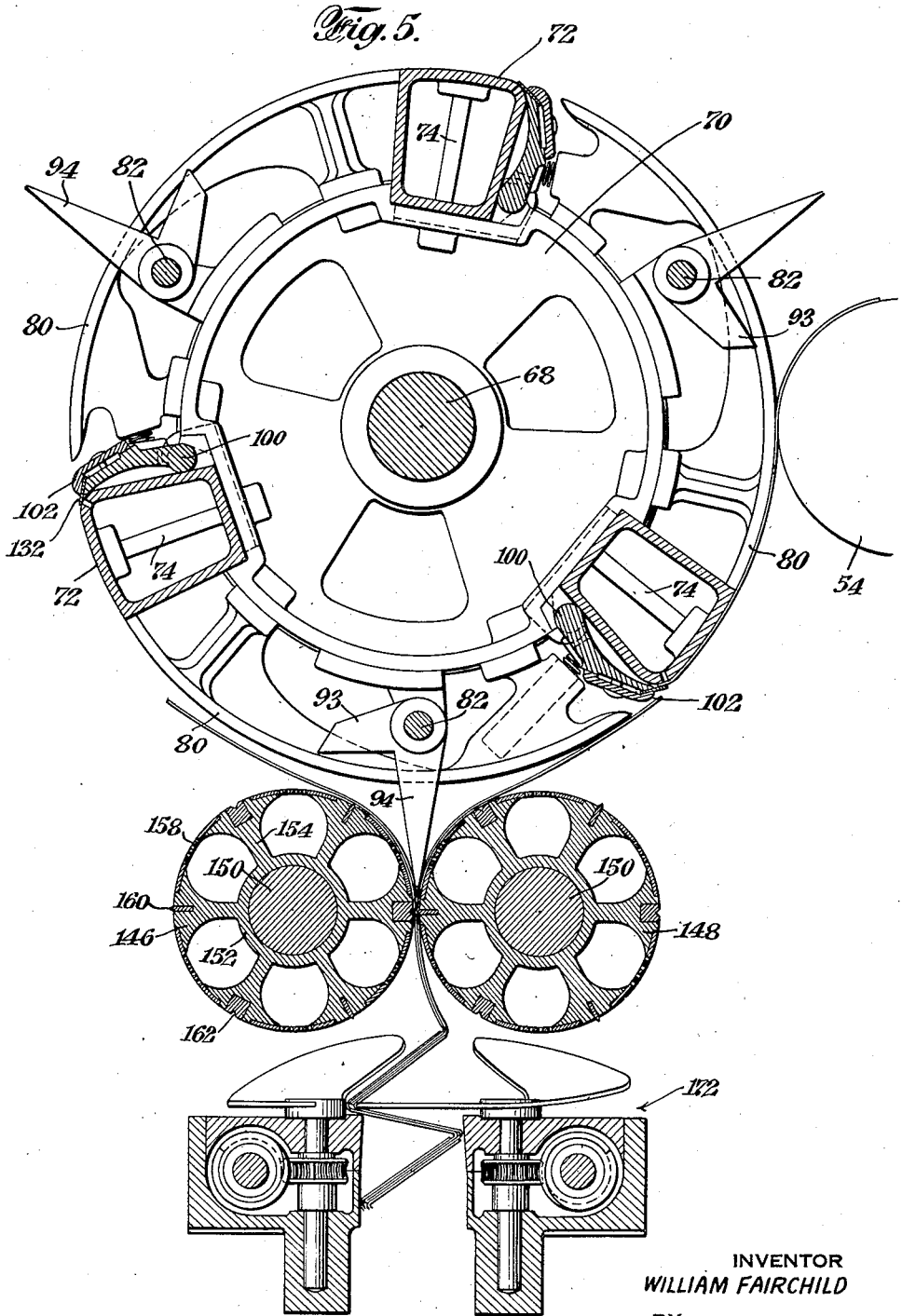

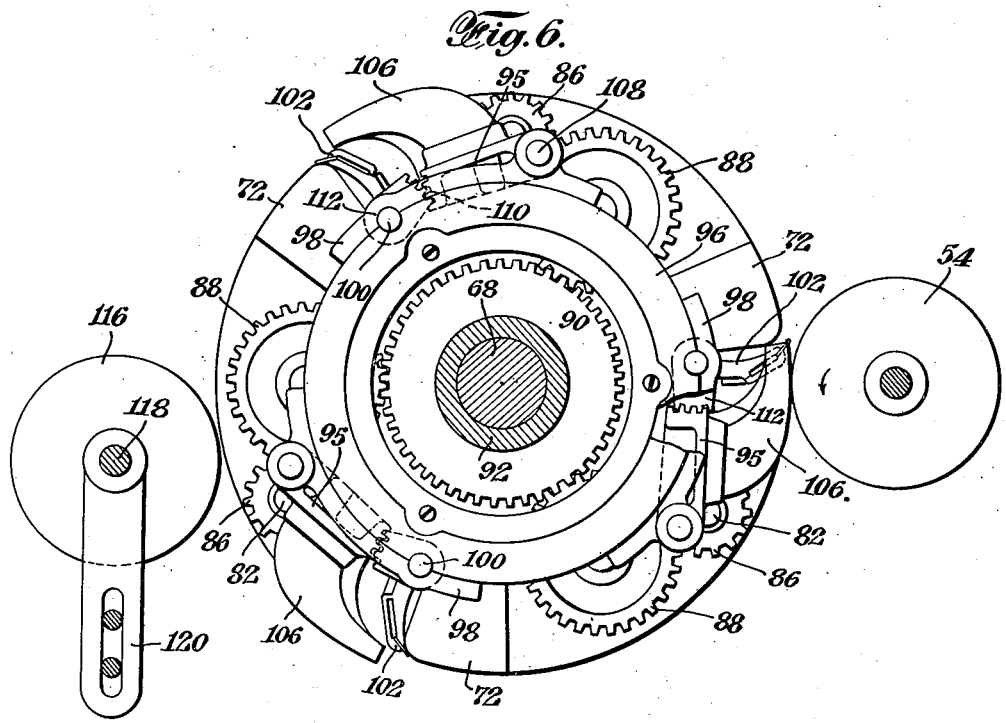
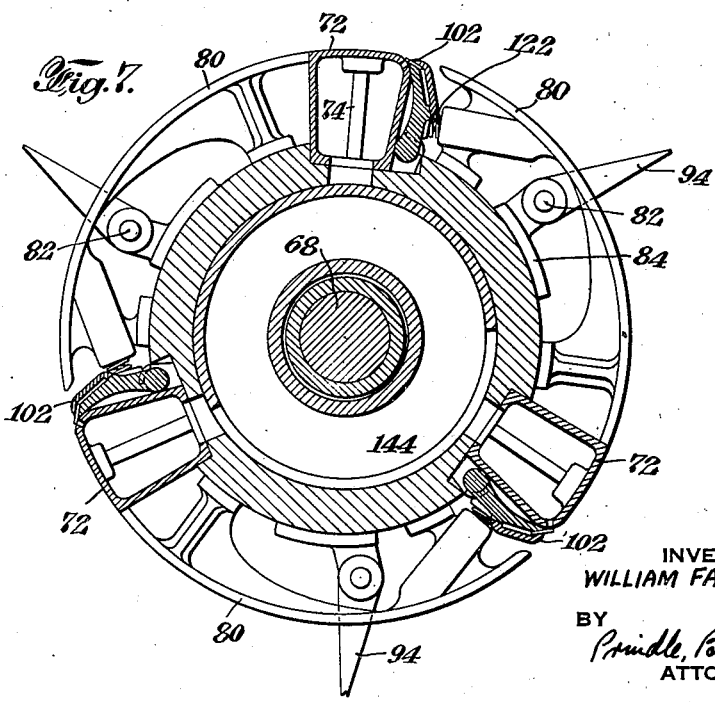

INVENTOR
WILLIAM FAIRCHILD
BY
Prindle, Bean + Mann
ATTORNEYS

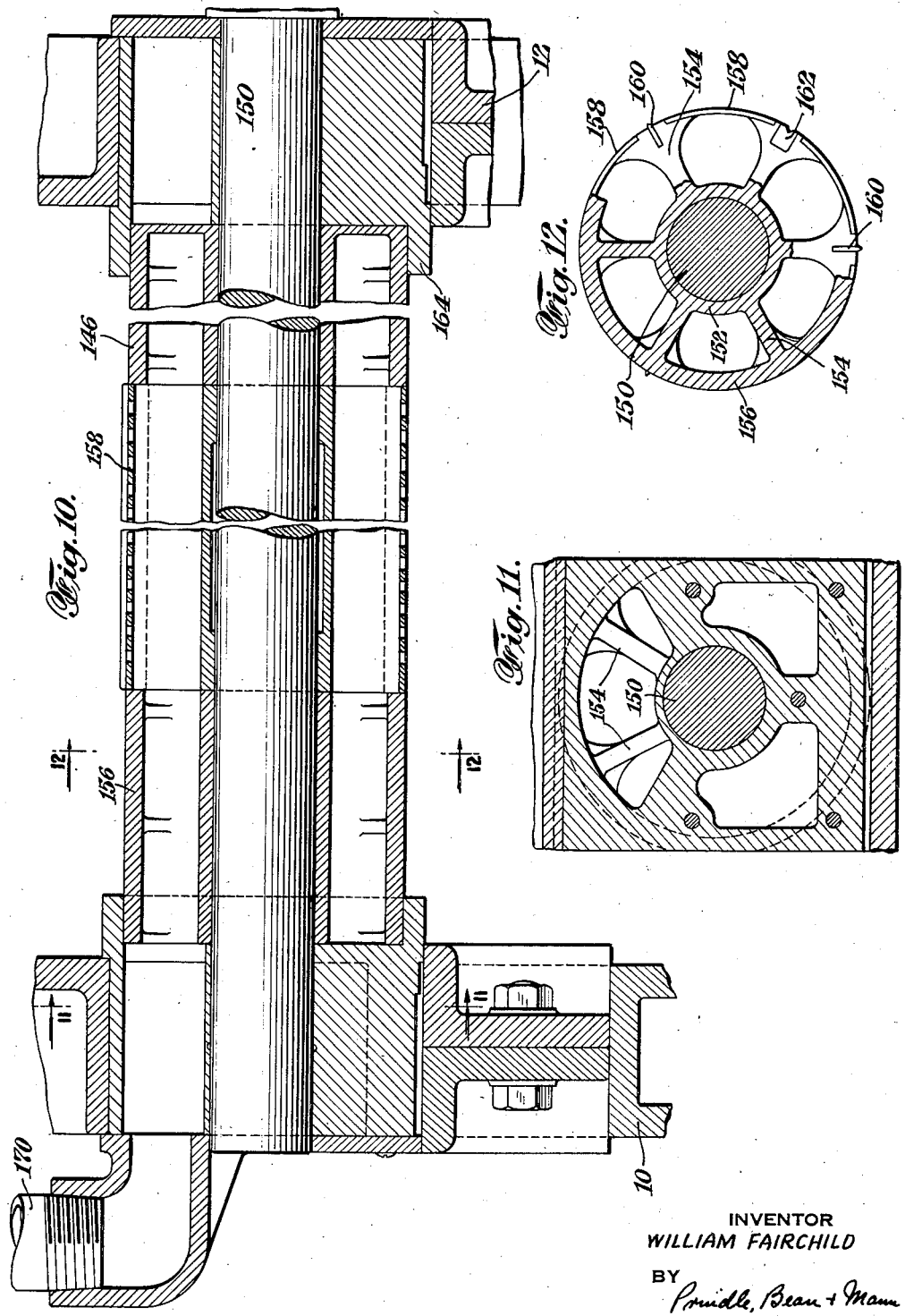

April 20, 1937.   W. FAIRCHILD   2,077,878
TOWEL CUTTING AND FOLDING MACHINE
Filed March 9, 1936   9 Sheets-Sheet 9
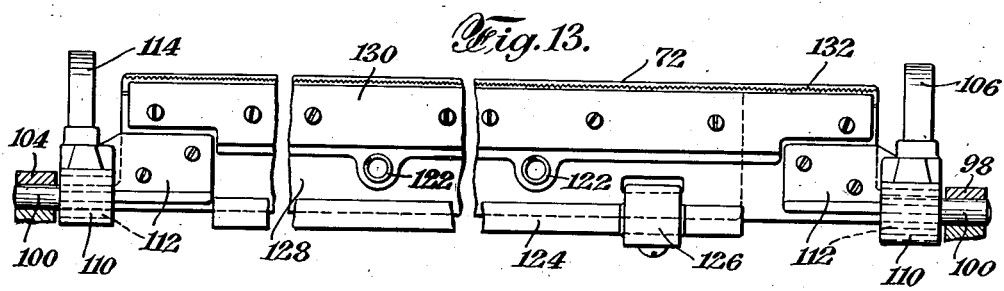
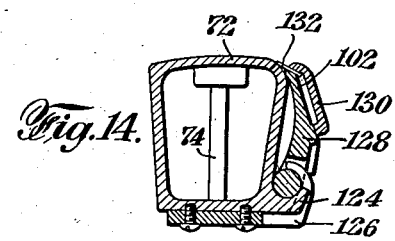
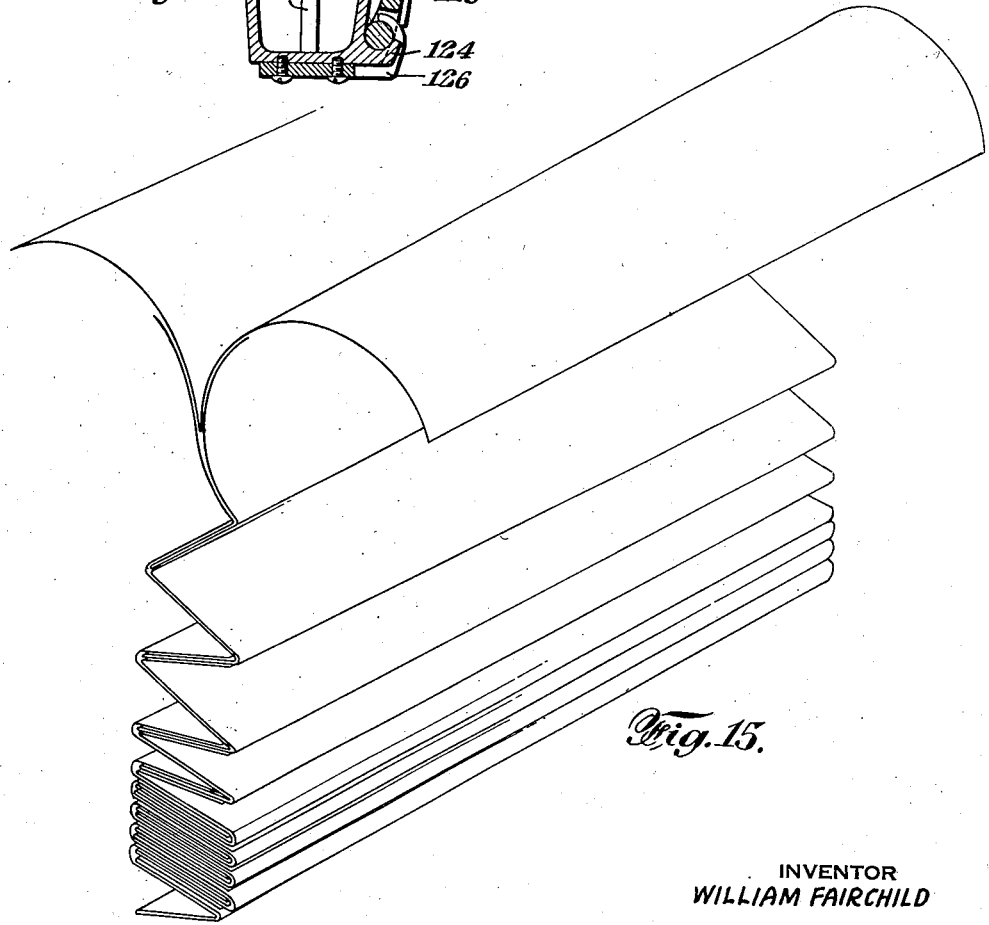
INVENTOR
WILLIAM FAIRCHILD
BY
Prindle, Bean + Mann
ATTORNEYS Patented Apr. 20, 1937

2,077,878

UNITED STATES PATENT OFFICE 2,077,878

TOWEL CUTTING AND FOLDING MACHINE

William Fairchild, Albany, N. Y., assignor to A. P. W. Paper Company, Inc., a corporation of New York Application March 9, 1936, Serial No. 67,789

16 Claims. (Cl. 270—39)

The subject-matter of this invention is a machine which takes a broad web of paper, slits it to the desired widths, cuts off the web into desired lengths, then folds the cut lengths in the middle, creases them into a zig-zag and at the same time interlocks successive pieces so that they are interfolded. It is particularly useful in connection with the production of interfolded paper towels.

The broad principles involved in this machine are as follows: First the web of paper is brought through a pair of rolls which slit the web longitudinally. The position of the slitting knives may be adjustable, or the machine may be so constructed that some of the slitting knives may be brought in or out of engagement with the sheet. After the slit sheets leave the slitting rolls, they are drawn around a large cutting roll which has a periphery approximately three times as great as the length to which the sheets are to be cut off. The cutting knife is carried by the cutting roll and is so arranged that after an edge has been cut, the cutting knife holds the free edge of the uncut sheet and in this holding is assisted by suction. The back or following edge of the cut sheet is free to move and tuckers move out from the main cutting roll to push the center of the cut sheet between two creasing rolls. At the time that the sheet is engaged between these creasing rolls, the leading edge of the cut sheet is released and suction then holds the sheet against the creasing rolls. The speed of the creasing rolls is reduced relative to the speed of the large cutting roll so that a second sheet is tucked in on top of the first one, after the first one has advanced two-thirds of its folded length. Each sheet is then creased so that it will fall into a third of its folded length and the continuous stream of interlocking sheets is stacked in a pile by arms which press the layers down by a helical action.

Figure 8:
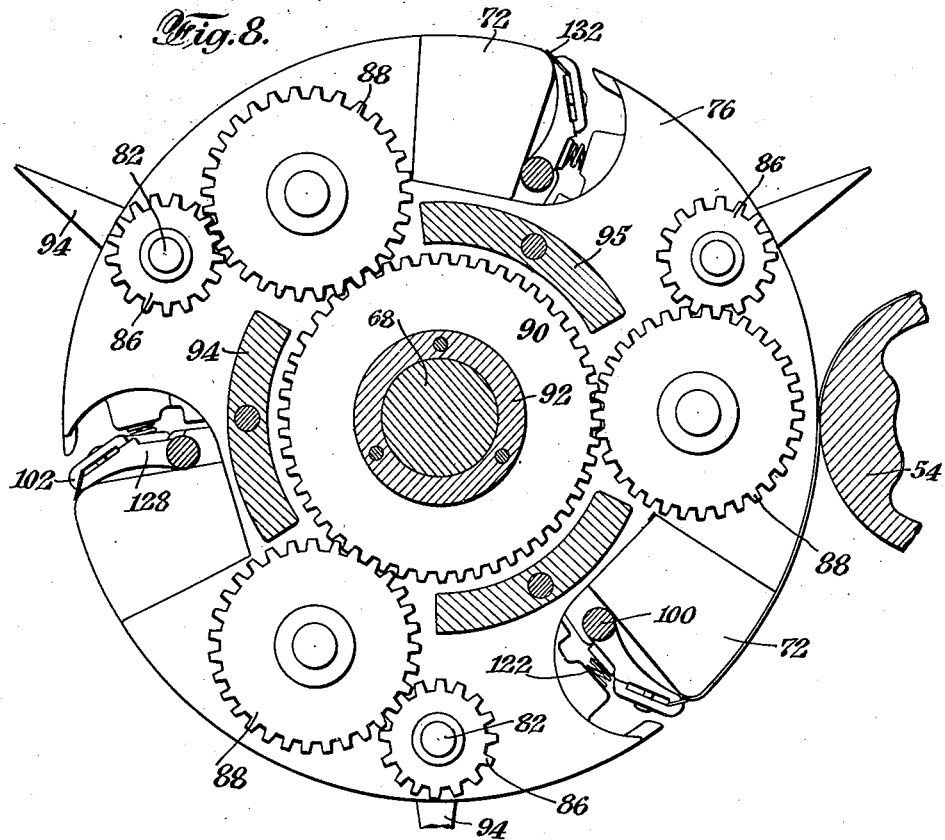
Figure 9:
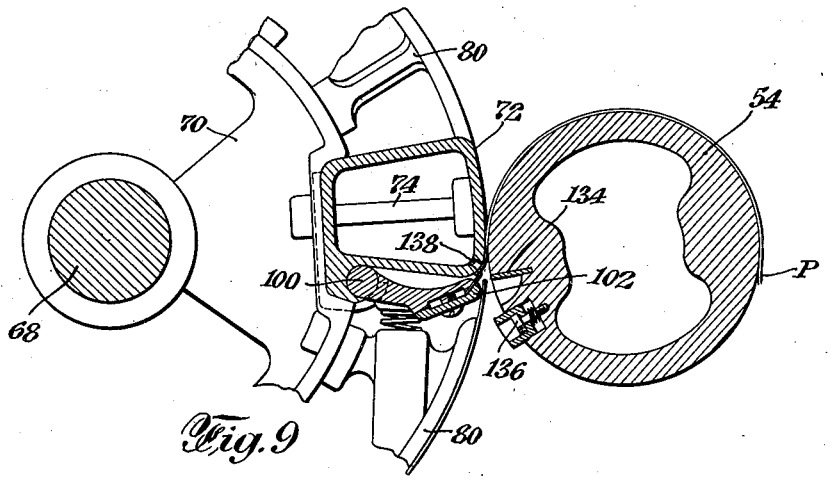

My invention can best be understood by reference to the example shown in the accompanying drawings, in which Fig. 1 is a view of the front or discharge face of the machine; Fig. 2 is a view of the suction end of the machine; Fig. 3 is a view of the gear end; Fig. 4 is a vertical section through the main cutting wheel; Fig. 5 is a section on line 5—5 of Fig. 4; Fig. 6 is a section on line 6—6 of Fig. 4; Fig. 7 is a section on line 7—7 of Fig. 4; Fig. 8 is a section on line 8—8 of Fig. 4; Fig. 9 is a detail section showing the cutting mechanism; Fig. 10 is a longitudinal section through one of the creasing rolls; Fig. 11 is a section on line 11—11 of Fig. 10; Fig. 12 is a section on line 12—12 of Fig. 10; Fig. 13 represents a detail of a cutter bar; Fig. 14 represents a section of a suction box on the main cutter roll; and Fig. 15 represents a diagrammatic showing of the manner of interfolding the slit and cut sheets of paper.

As here illustrated, the machine comprises two main end members 10 and 12 between which runs the transverse support member 14 carrying a motor 16. The motor 16 drives the wheel 18 of the Reeves gear shift mechanism comprising the two adjustable cone pulleys 20 and 22 connected by the belt 24. From this gear change mechanism the power is transmitted by chain 25 to the main drive shaft 26 connected by clutch 28 with sprocket wheel 30. The clutch 28 is operated by lever 32. Sprocket wheel 30 is connected by chain 34 with sprocket wheel 36 mounted on shaft 38. At the opposite end (see Fig. 3) shaft 38 carries the pinion 40, engaging gear wheel 42 of the main cutting wheel.

Meshing with gear wheel 42 are two trains of gears. The first of these, comprising the wheels 44, 46, 48, 50 and 52, operate the feed and slicing rolls 54, 56, 58, 60 and 62 respectively (see Fig. 2). Of these rolls 60 and 62 are the slicing rolls, and it will be noted that some or all of the knives 64 can be drawn out of operation by the handles 66.

The paper web P is drawn from the main supply roll R and then passes between rolls 60 and 62 where it is slitted to the proper widths; thence under roll 58 and between rolls 54 and 56. 56 is a feed roll which may be made of spaced discs. From roll 54 the paper passes around the main cutting roll where it is cut to proper length and delivered to the folding mechanism.

The main cutting roll is shown in detail in Figs. 4 to 8 inclusive. This roll is carried by the shaft 68 mounted in the main end members 10 and 12. Fixed on this shaft are a series of spiders 70, all of which are alike. These spiders which are shown in section in Fig. 4 and in elevation in Fig. 5 are spaced a short distance apart longitudinally, to leave room for the operation of the tucker fingers hereafter described. Running longitudinally and connecting together the spiders are three suction boxes 72. These are held in place by spaced screws 74 which pass into certain of the spiders. At one end, the spiders are supplemented by an end plate 76 which is mounted on the shaft 68 and shown in elevation in Fig. 8, and at the other end by a supplemental member 78.

The member 78 has a portion surrounding the shaft 68 and an outwardly extending web portion, which portions are somewhat similar to the corresponding parts of the spiders 70. In addition, member 78 has a cylindrical portion extending concentric with the axis of shaft 68, supporting the ends of the suction boxes 72. As shown in Fig. 4, the suction opening in the end of the suction box 72 here illustrated coincides with a corresponding opening in the member 78, and obviously this is true for each of the three suction boxes 72. At its outer edge member 78 also carries certain shaft-supporting brackets which will later be described.

Mounted on each spider 70 are three face plate members 80 running around from one suction box almost to the next one (see Figs. 5 and 7). Each of the members 80 has a rim portion the aggregates of which form the bulk of the face of the cutting roll. All these rim portions are separated longitudinally as shown in Fig. 4 to provide circumferential spaces for the movement of the tucker fingers.

Each member 80 has the webbing which supports the peripheral face of such member cut away to provide space for the passage of three shafts 82 which are mounted at one end in member 76 and at the other end and at intermediate points along their length in bearing members 84 carried by spiders 70 (see Fig. 4). At the end where the shafts 82 pass through end plate 76 each carries a pinion 86 which engages with a gear 88 (see Fig. 8) and the gears 88 in turn engage with a stationary or sun gear 90 which is concentric with shaft 68 but does not rotate with that shaft. As shown in Fig. 4, gear 90 is connected with end member 12 by a ring 92.

Along each shaft 82 are mounted a plurality of tucker fingers 94. The function of these tucker fingers is to force the middle of each sheet down between the folding and creasing rolls as will be hereinafter described. To this end, the gears 86, 88 and 90 are so proportioned that as shaft 68 rotates to bring a set of tucker fingers to the bottom position, the tip of such tucker finger in that set will move downwardly in such a way that the loci of their points will fall approximately in a vertical plane passing radially through the axis of shaft 68. As indicated in Fig. 5, the tucker fingers will also move outwardly in two other positions, but this movement is without function. Connected to each tucker finger 94 is a kicker arm 93 which moves outwardly as its corresponding tucker arm is moving back toward the periphery of the cutting wheel. The kicker arms 93 are to free the ends of the cut sheet and assist in feeding the sheet down onto the creasing rolls.

Extending out from end plate 76 are three segmental web members 95 to which is attached a ring 96 (see Fig. 6) carrying brackets 98 in which are mounted the pivots 100 of the cutter bars 102, the other ends of which pivots are carried by similar brackets 104 carried by end members 78. Likewise carried by brackets 96 are cam arms 106 (see Fig. 6) which are pivoted on shafts 108. Each cam arm 106 has a toothed front portion 110 which engages a segment 112 mounted on shaft 100 so that when a cam arm 106 is pressed inwardly a corresponding cutter bar 102 will be swung away from its adjacent suction box 72. This mechanism is duplicated at the other end of the machine as indicated by the cam arms 114. The cam arms 106 and 114 are each operated twice during the rotation of the cutter roll: once in contact with roll 54 and once by contacting with one of the idler wheels 116 one of which is carried by each end of a shaft 118 mounted between two brackets 120 carried respectively by end members 10 and 12.

At various points along the length of the cutter bars 102 are mounted springs 122 tensioning each cutter bar toward its adjacent suction box 72. The pivoting of the cutter bars is provided by sockets 124 formed at the side of each suction box 72 (see Fig. 11) and the cutter bars are held in such sockets by clamps 126 screwed at intervals to the inner face of the suction box. Each cutter bar 102 comprises a main arm member 128, the clamping plate 130 and a serrated cutting blade 132.

The cutter bars 102 have two functions—they cooperate with the roll 54 to sever the sheet and they also serve to hold the cut-end of the sheet in place on the main cutting roll. This is illustrated in Fig. 9.

As previously stated, the paper web P passes over roll 54. This roll has a circumference which is one-third of the circumference of the main cutting roll and carries a cutting knife 134 which will cooperate with each cutter blade 132. Just in advance of the cutting knife 134 is a spring pressure bar 136 which extends lonigtudinally of roll 54 to hold the paper against the main cutting roll even though the point of holding is beyond the point of nearest contact of the main cutting roll and the roll 54.

As the paper web is severed through the action of cutters 132 and 134 the rear edge of the cut-off portion is momentarily held by bar 136. At the same time (through mechanism later to be described) suction has been applied to the adjacent suction box 72 which acts through a series of perforations 138 adjacent the cutting point. This suction pulls against the forward edge of the main paper web and holds this forward edge momentarily against the corner of the suction box 72. Almost immediately after the cutting has taken place, the cam 106 passes out from under its contact with roll 54 (see Fig. 6) and the cutter bar 102 is forced back against the corner of the suction box 72 through the action of the springs 122. Since the forward edge of the paper had been held against this corner of the suction box, it will now be held positively by the pressure of the cutter bar and the vacuum tension can be released. This holding of the forward edge of the web will continue until approximately the time that the next sheet is being cut, when the pressure of the cutter arm 102 against the suction box 72 will be released through the cooperation of the appropriate cam 106 and the idler roll 116. As shown in Fig. 6, it may be noted that the brackets 120 for the idler roll 116 are adjustable vertically so that the release of the edge of the sheet can be caused to occur at exactly the correct time.

Suction is applied to the suction box through a casting 140 which extends into the outer circumferential portion of member 78 (see Fig. 4). The casting 140 is stationary and is connected through a pipe 142 with a vacuum pump not shown. The casting 140 has formed in its outer circumference a port 144 (see Fig. 7) so positioned that it will register with the vacuum opening through member 78 to a suction box at about the time that the corresponding cutter knife of that suction box is functioning as has already been described.

As will be seen from the foregoing description, the forward edge of the sheet is gripped between a cutter bar 102 and the corner of the corresponding suction box 72. Shortly after this gripped edge passes beyond the bottom point, the tucker arms 94 will begin to push down on the sheet, forcing it away from the main cutting roll. The draw of these tucker fingers will be entirely from the back edge of the sheet. Positioned immediately below the main cutting roll are a pair of creasing rolls 146 and 148 and these are so arranged that when the tucker fingers 94 are extended outwardly to their maximum extent, they will force the cut sheet into the bight between these two rolls. The roll 116 which controls the release of the forward edge of the cut sheet or towel is so positioned that this sheet is released just when the tips of the tucker fingers are above the middle of the sheet, so that it is the middle of each sheet which is tucked between the bight of the rolls 146 and 148. As the main cutting roll revolves and the tucker fingers move away from the rolls 146 and 148 the kicker arms 93 come into play, insuring the freeing of the forward edge of the cut sheet from contact with the main cutting roll.

The creasing rolls 146 and 148 have a peripheral speed which is one-third of the peripheral speed of the main cutting roll. As a result after a sheet has been tucked into the bight of these creasing rolls, even though it is folded in half, it will not be entirely through from between these rolls when the next sheet is being tucked in, but will have only passed through two-thirds of its folded length. Thus if the parts are so proportioned that sheets of 15 inches in total length are being cut on the main cutting roll, these will be folded in half to make a folded length of 7½ inches and 5 inches of this 7½ will have passed between the rolls 146 and 148 at the time that the next sheet is being tucked in. This is one of the primary functions of the machine, that each successive sheet shall be tucked into the sheet in advance of it for a predetermined proportion of its length which in this case is one-third of the folded sheet.

The construction of the creasing rolls 146 and 148 is particularly shown in Figs. 10, 11 and 12. Each of these rolls is mounted on a shaft 150 journalled in the end supports 10 and 12. These rolls are not solid but each of them is made up of a central portion 152 having outwardly extending arms 154. Adjacent the ends of the roll the arms 154 are connected by integral surface webbing 156 to form the roll surfaces, but intermediate the ends, the arms 154 are connected by separate perforated plates 158 through which vacuum can be applied. Alternate arms 154 carry creasing projections 160 and creasing grooves 162. The rolls are so mounted that a projection 160 of one roll cooperates with a groove 162 of the other roll and vice versa so that the paper passing between these rolls will be given alternate creases in opposite directions.

The journals for the shafts 150 also extend out around the periphery of the rolls. Thus the journal mounted in member 12 is shown at the right hand of Fig. 10 and is designated by the numeral 164. At this end the journal member simply supports the wheel. At the other end the journal is in the form of a rectangular shaped box as indicated in Fig. 11 having a segmental cavity near the top of a size approximately to overlie two of the segments between successive arms 154. Connected to these segmental openings are vacuum pipes 170 connected to the vacuum pump. It will thus be seen that as the rolls 146 and 148 revolve, suction will be exerted near the top to hold the free edges of the paper back against these rolls and thus leaving an open space into which the next succeeding strip of paper can be tucked.

The inter-folded sheets of paper or towels are given alternate creases as they pass through between the rolls 146 and 148 and may then pass through a helical stacking machine of known construction as indicated at 172 at the bottom of Fig. 5.

It is understood that the foregoing description is given by way of illustration only and that the principles therein set forth may be used in other detailed types of construction without departing from the spirit of my invention.

What I claim is:

1. In a device of the character described, the combination of a cutting roll, means carried thereby for grasping and holding the forward portion of a web of paper from which a sheet has been cut, means for cutting from such web a sheet after a predetermined degree of rotation of such cutting roll, means for forcing the central portion of such cut sheet from the cutting roll to the bight of a pair of creasing rolls, and driving gears for said rolls synchronized so that the peripheral speed of the creasing rolls is less than half the peripheral speed of the cutting roll whereby each sheet is delivered from the cutting roll before a previous sheet is released from the creasing rolls.

2. A structure as specified in claim 1 which further includes means carried by the creasing rolls to hold apart the sides of the sheet which have not passed through their bight whereby the folded edge of each sheet is received between the free edges of a preceding sheet.

3. A structure as specified in claim 1 in which the means for forcing the cut sheets from the cutting roll to the creasing rolls comprises a series of tucker arms carried by the cutter roll and mounted for rotation relative thereto, and means for driving such tucker arms such that as the tips of such tucker arms move out from the periphery of the cutting roll such tips will follow a path which approaches an extension of a fixed radius of the cutting roll, each of said tucker arms having a kicker portion which assists in delivering the cut sheet to said creasing rolls.

4. A device of the character described, including, in combination, a cutting roll, said cutting roll comprising means for cutting a sheet from a web of paper, a pair of creasing rolls, means carried by said cutting roll for forcing the central portion of the cut sheet between said creasing rolls, means for driving said creasing rolls at a peripheral speed less than one half the peripheral speed of said cutting roll whereby each sheet is delivered to the creasing rolls before the previous sheet is released from the creasing rolls and an interfolding of the sheets is obtained.

5. A structure as specified in claim 4 in which the peripheral speed of said creasing rolls is about one third the peripheral speed of said cutting roll whereby one third of each sheet is interfolded with the previous sheet.

6. A device of the character described, including, in combination, a cutting roll, said cutting roll comprising means for cutting a sheet from a web of paper, a pair of creasing rolls, means on said cutting roll for forcing the central portion of the cut sheet between said creasing rolls, means for driving said creasing rolls at a peripheral speed less than one half the peripheral speed of said cutting roll whereby each sheet is delivered to the creasing rolls before the previous sheet is released from the creasing rolls and an interfolding of the sheets is obtained, said creasing rolls having suction means to hold down the edges of the cut sheet and provide an open space into which the next sheet can be tucked.

7. A device of the character described, including a cutter roll having a cutting blade pivotally mounted thereon for cutting a sheet from a web of paper, suction means on said cutter roll for temporarily holding the cut edge of the web against said cutter roll, said blade being resiliently mounted to be normally pressed against said cutter roll to releasably hold the cut edge of the web against said cutter roll after a cutting operation for advancing the web into position for the next cutting operation.

8. A device of the character described, including a cutter roll having a cutting blade pivotally mounted thereon for cutting a sheet from a web of paper, suction means on said cutter roll for temporarily holding the cut edge of the web against said cutter roll, said blade being resiliently mounted to be normally pressed against said cutter roll to releasably hold the cut edge of the web against the cutter roll after a cutting operation for advancing the web into position for the next cutting operation, and means for moving said blade on its pivot for releasing the held edge of the sheet after the next cutting operation in order to release the cut sheet and for permitting its removal from said cutter roll.

9. A device of the character described, including, in combination, a cutting roll, provided with means for cutting sheets from a web of paper, a pair of creasing rolls adjacent said cutting roll for receiving and creasing sheets cut from the web, and means on said cutting roll for forcing the central portion of the cut sheet between said creasing rolls, said last mentioned means including rotatably mounted tucker arms, said arms being so mounted that the tip thereof will move out from the periphery of said cutting roll and during such movement will follow a path which approaches an extension of a fixed radius of said cutting roll, said tucker arms each having a kicker portion which assists in delivering the cut sheet to said creasing rolls.

10. A device of the character described, including a cutting roll, means for feeding a web of paper adjacent said cutting roll, said cutting roll having a cutting blade pivotally mounted thereon for cutting a sheet from the web, suction means on said cutting roll for temporarily holding the cut edge of the web against said cutting roller, said blade being resiliently mounted to be normally pressed against said cutting roll to releasably hold the cut edge of the web against the cutting roll after a cutting operation for advancing the web into position for the next cutting operation, the suction means releasing its holding of the edge of the web after the blade is moved to hold the edge of the web, creasing rolls adjacent said cutting roll, means on said cutting roll for forcing the central portion of the cut sheet between said creasing rolls.

11. A device of the character described, including a cutting roll, means for feeding a web of paper adjacent said cutting roll, said cutting roll having a cutting blade pivotally mounted thereon for cutting a sheet from the web, suction means on said cutting roll for temporarily holding the cut edge of the web against said cutting roller, said blade being resiliently mounted to be normally pressed against said cutting roll to releasably hold the cut edge of the web against the cutting roll after a cutting operation for advancing the web into position for the next cutting operation, the suction means releasing its holding of the edge of the web after the blade is moved to hold the edge of the web, creasing rolls adjacent said cutting roll, means on said cutting roll for forcing the central portion of the cut sheet between said creasing rolls, said means for forcing the cut sheet between the creasing rolls including tucker arms rotatably mounted on said cutting roll and kicker arms for assisting in delivering the cut sheet onto said creasing rolls.

12. A device of the character described, including, a cutter roll, a cutting blade pivotally mounted on said cutter roll for cutting sheets from a web of paper, cam means on said cutter for moving said cutting blade into cutting position and a spring for moving said cutting blade in the reverse direction, and a suction box on said cutter roll adjacent said cutting blade, said suction box and cutting blade cooperating to hold a cut edge of a web of paper and to advance the web through the device.

13. A device of the character described, including, a cutter roll, a cutting blade pivotally mounted on said cutter roll for cutting sheets from a web of paper, cam means on said cutter for moving said cutting blade into cutting position and a spring for moving said cutting blade in the reverse direction, and a suction box on said cutter roll adjacent said cutting blade, said suction box and cutting blade cooperating to hold a cut edge of a web of paper and to advance the web through the device, and means for moving said cutting blade after a predetermined amount of rotation of said cutter roll to release the held edge of the web of paper.

14. In a device of the character described, a cutter roll, a suction box mounted thereon, a cutting blade pivotally and resiliently mounted on said suction box, and means whereby said cutting blade may be operated to cut a sheet from a web of paper, said suction box and cutting blade cooperating to hold a cut edge of a web of paper and to advance the web through the device.

15. A device of the character described, including a cutter roll having cutting blades for cutting sheets from a web of paper, said cutting blades being pivotally mounted, suction boxes adjacent said cutting blades, said suction boxes and cutting blades cooperating to hold one edge of a paper web and draw it into position for a cutting operation, cam means for operating said cutting blades, a pair of creasing rolls provided with suction means, tucker arms on said cutter roll for forcing the central portion of a cut sheet between said creasing rolls, said suction means on said creasing rolls serving to hold the edges of the sheet apart to permit the tucking-in of the next sheet to get an interfolding of the sheets, and means for interfolding said sheets.

16. A device of the character described, including, a cutter roll having cutting blades for cutting sheets from a web of paper, said cutting blades being pivotally mounted, suction boxes adjacent said cutting blades, said suction boxes and cutting blades cooperating to hold one edge of a paper web and draw it into position for a cutting operation, cam means for operating said cutting blades, a pair of creasing rolls provided with suction means, tucker arms on said cutter roll for forcing the central portion of a cut sheet between said creasing rolls, said suction means on said creasing rolls serving to hold the edges of the sheet to permit the tucking-in of the next sheet to get an interfolding of the sheets, and means for interfolding said sheets, said tucker arms having kicker arms which assist in arranging the cut sheets on said creasing rolls.

WILLIAM FAIRCHILD.